(12) United States Patent
Petrov et al.

(10) Patent No.: US 12,488,465 B2
(45) Date of Patent: Dec. 2, 2025

(54) WEAKLY SUPERVISED LESION SEGMENTATION

(71) Applicant: Genentech, Inc., South San Francisco, CA (US)

(72) Inventors: Yury Anatolievich Petrov, South San Francisco, CA (US); Richard Alan Duray Carano, South San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 702 days.

(21) Appl. No.: 17/864,227

(22) Filed: Jul. 13, 2022

(65) Prior Publication Data

US 2022/0351387 A1    Nov. 3, 2022

Related U.S. Application Data

(63) Continuation of application No. PCT/US2021/014611, filed on Jan. 22, 2021.

(Continued)

(51) Int. Cl.
*G06F 17/00* (2019.01)
*G06T 7/00* (2017.01)
(Continued)

(52) U.S. Cl.
CPC ............ *G06T 7/11* (2017.01); *G06T 7/0012* (2013.01); *G06V 10/764* (2022.01); *G06T 2207/30096* (2013.01); *G06V 2201/031* (2022.01)

(58) Field of Classification Search
CPC ....... G06T 7/11; G06T 7/0012; G06V 10/764; G06V 2201/031
See application file for complete search history.

(56) References Cited

U.S. PATENT DOCUMENTS 11,195,052 B2 * 12/2021 Ngo Dinh ............ A61B 1/2736
11,574,112 B2 * 2/2023 Song ..................... G06V 10/82
(Continued)

FOREIGN PATENT DOCUMENTS

| JP | 2010029481 A | 2/2010 |
|---|---|---|
| WO | 2019238804 A1 | 12/2019 |
| WO | 2021150889 A1 | 7/2021 |

OTHER PUBLICATIONS

Zhu, et al., Unpaired Image-To-Image Translation Using Cycle-Consistent Adversarial Networks, The IEEE International Conference on Computer Vision (ICCV), 2017, 18 pages, Available Online at: https://arXiv:1703.10593v7.

(Continued)

*Primary Examiner* — Mohammed H Zuberi
(74) *Attorney, Agent, or Firm* — Kilpatrick Townsend & Stockton LLP

(57) ABSTRACT

A Generative Adversarial Network (GAN) can be trained, where the GAN includes an anomaly-removing Generator network configured to modify a medical image to remove a depiction of a biological anomaly and one or more Discriminator networks (each configured to discriminate between real and fake images). The anomaly-removing Generator network can then receive a medical image that depicts a particular biological anomaly (or pre-processed version thereof) and generate a modified image predicted to lack any depiction of the particular biological anomaly. The size of the particular biological anomaly may be estimated based on the modified image and the received image (or pre-processed version thereof).

21 Claims, 12 Drawing Sheets
(7 of 12 Drawing Sheet(s) Filed in Color)

Related U.S. Application Data

(60) Provisional application No. 62/965,515, filed on Jan. 24, 2020, provisional application No. 62/966,084, filed on Jan. 27, 2020.

(51) Int. Cl.
*G06T 7/11* (2017.01)
*G06V 10/764* (2022.01)

(56) References Cited

U.S. PATENT DOCUMENTS

| | | | | |
|---|---|---|---|---|
| 12,175,659 | B2* | 12/2024 | Rubin | G06T 7/174 |
| 12,211,261 | B2* | 1/2025 | Kim | G06V 10/7747 |
| 2014/0037159 | A1* | 2/2014 | Cho | G06T 7/0012 |
| | | | | 382/128 |
| 2018/0225823 | A1 | 8/2018 | Zhou et al. | |
| 2019/0220701 | A1* | 7/2019 | Novak | G06F 18/2113 |
| 2019/0392580 | A1* | 12/2019 | Kapil | G06V 20/695 |
| 2021/0166379 | A1* | 6/2021 | Smith | G06T 7/30 |
| 2021/0248736 | A1* | 8/2021 | Kamen | G06F 18/214 |
| 2022/0101521 | A1* | 3/2022 | Katzmann | G06V 10/764 |
| 2022/0301154 | A1* | 9/2022 | Li | G06N 3/084 |

OTHER PUBLICATIONS

Bansal, et al., Recycle-Gan: Unsupervised Video Retargeting, The European Conference on Computer Vision (ECCV), 2018, 17 pages, Available Online at: https://arXiv:1808.05174v1.

Frid-Adar et al., "GAN-based Synthetic Medical Image Augmentation for Increased CNN Performance in Liver Lesion Classification", Available Online at: https://arxiv.org/abs/1803.01229, 2018, pp. 1-10.

Gui et al., "A Review on Generative Adversarial Networks: Algorithms, Theory, and Applications", Journal of Latex Class Files, vol. 14, No. 8, Available Online at: https://arxiv.org/abs/2001.06937, Aug. 2015, pp. 1-28.

Schlegl et al., "F-Anogan: Fast Unsupervised Anomaly Detection with Generative Adversarial Networks", Medical Image Analysis, vol. 54, Available Online at: https://www.researchgate.net/publication/330796048_f-AnoGAN_Fast_Unsupervised_Anomaly_Detection_with_Generative_Adversarial_Networks, 2019, 24 pages.

Xu et al., "Segmentation and Quantification of Infarction Without Contrast Agents via Spatiotemporal Generative Adversarial Learning", Medical Image Analysis, vol. 59, Oct. 4, 2019, 14 pages.

Zenati et al., "Efficient GAN-Based Anomaly Detection", Available Online at: https://arxiv.org/abs/1802.06222, 2018, all pages.

Xu et al., "Semi-Supervised Attention-Guided CycleGAN for Data Augmentation on Medical Images", 2019 Institute of Electrical and Electronics Engineers International Conference on Bioinformatics and Biomedicine (BIBM), Nov. 18, 2019, 6 pages.

* cited by examiner

WEAKLY SUPERVISED LESION SEGMENTATION

CROSS-REFERENCE TO RELATED APPLICATIONS

This application is a continuation of PCT/US2021/014611, filed on Jan. 22, 2021, which claims priority and benefit from U.S. Provisional Patent Applications 62/965,515, filed on Jan. 24, 2020, and 62/966,084, filed on Jan. 27, 2020. Each of these applications is hereby incorporated by reference in its entirety for all purposes.

FIELD

Generally, disclosed techniques relate to estimating a size of a biological anomaly depicted in a medical image by using a neural network (e.g., a Generator network) to generate a fake version of the image that lacks the anomaly and subtracting the fake image from the medical image. The Generator network can be trained by training a Generative Adversarial Network (GAN) (e.g., a Recycle-GAN or Cycle-GAN) that includes the Generator network.

BACKGROUND

Medical imaging is often used to detect and/or monitor for a biological anomaly (e.g., a lesion or tumor). Quantifying the size of the biological anomaly frequently entails an annotator marking an outline of the anomaly on one or more images (e.g., corresponding to one or more slices). This is a time-intensive and is prone to error as a result of variation across annotations due to subjectivity of border locations.

Thus, it would be advantageous to identify an automated technique for processing images to detect and predict sizes of biological anomalies.

SUMMARY

An anomaly-removal Generator network is used to process a real image that depicts a biological anomaly of a given type (e.g., a tumor or a lesion). The Generator network can include one or more three-dimensional kernels. The processing can include generating a fake image that corresponds to the real image but that lacks a depiction of the biological anomaly of the given type. The real and fake images can then be used to segment the biological anomaly to thereby identify a boundary, area or volume of the biological anomaly. Additionally or alternatively, the real and fake images can then be used to estimate a size and/or position of the biological anomaly of the given type. Estimating the size of the biological anomaly may include subtracting the fake image(s) from the corresponding real image(s). A size of the biological anomaly may be estimated based on a total number of pixels or voxels with intensities that exceed a predefined threshold. In some instances, a filtering or other processing is performed before estimating the size (e.g., by applying one or more thresholds and/or applying one or more spatial smoothing functions).

The anomaly-removal Generator network can be configured in response to a training of a larger Generative Adversarial Network (GAN). The GAN may include a Cycle-GAN, which may include—in addition to the anomaly-removal Generator network (configured to generate images without any depiction of given type of biological anomaly), another anomaly-addition Generator network (configured to generate images that depict the given type of biological anomaly). The Cycle-GAN can further include multiple Discriminator networks. Each Discriminator network can be configured to receive both real and fake images (either corresponding to anomaly-present or anomaly-absent instances) and to determine whether each of the images is real. Feedback generated based on the accuracy of the results generated by each Discriminator network can be fed back to a corresponding one of the Generator networks. The Cycle-GAN can be configured such that the anomaly-addition Generator network and/or the anomaly-removal Generator network receives and generates a three-dimensional image (using a set of three-dimensional kernels). Similarly, the Cycle-GAN can be configured such that each Discriminator network receives a three-dimensional image (and predicts whether the image is a real or fake image).

The GAN may alternatively include a Recycle-GAN, which includes the Generator networks and Discriminator networks of the Cycle-GAN and further includes one or more Predictor networks. Each Predictor network may be configured and trained to generate a fake image corresponding to a different perspective, imaging modality, location, zoom, and/or slice as compared to a perspective, imaging modality, location, zoom, and/or slice depicted in an image generated by a Generator network feeding to the Predictor network. Each Discriminator network can be configured and trained to receive both real and fake images (either corresponding to anomaly-present or anomaly-absent instances) and to determine whether each of the images is real. Results generated by a given Discriminator network can be fed back to a Generator network feeding to the Predictor network that feeds to the given Discriminator network to potentially trigger parameter learning.

In a first embodiment, a computer-implemented method is provided. A medical image is accessed that corresponds to a subject and that depicts a part of a biological anomaly, the biological anomaly being of a particular type of biological anomaly. A modified image is generated based on the medical image and using an anomaly-removal Generator network. The anomaly-removal Generator network can be configured with parameters learned during training using a training data set that lacks annotations of the particular type of biological anomaly. A size of the biological anomaly is estimated based on the medical image and the modified image. The estimated size of the biological anomaly is output.

In a second embodiment, a method may include the method of the first embodiment and further: training the anomaly-removal Generator network by training a Generative Adversarial Network that includes: the anomaly-removal Generator network; and one or more Discriminator networks, where each of the one or more Discriminator networks is configured and trained to discriminate between a real image and an image generated by a Generator network, the Generator network including the anomaly-removal Generator network or an anomaly-addition Generator network.

In a third embodiment, a method may include the method of the first embodiment, where a set of parameters of the anomaly-removal Generator network was defined by training a Generative Adversarial Network that included: the anomaly-removal Generator network; and one or more Discriminator networks, where each of the one or more Discriminator networks was configured and trained to discriminate between a real image and an image generated by a Generator network, the Generator network including the anomaly-removal Generator network or an anomaly-addition Generator network.

In a fourth embodiment, a method may include the method of the first embodiment and further: training the anomaly-removal Generator network by training a Generative Adversarial Network that includes: the anomaly-removal Generator network; an anomaly-addition Generator network; a first Discriminator network; and a second Discriminator network. The first Discriminator network can be configured to discriminate between: real images that are labeled as depicting at least part of a biological anomaly of the particular type of biological anomaly; and fake images generated by the anomaly-addition Generator network. The anomaly-addition Generator network may receive feedback during training based on first discrimination results generated by the first Discriminator network. The second Discriminator network may be configured to discriminate between: real images that are labeled as not depicting any biological anomaly of the particular type of biological anomaly; and fake images generated by the anomaly-removal Generator network. The anomaly-removal Generator network can receive feedback based on first discrimination results generated by the first Discriminator network.

In a fifth embodiment, a method may include the method of the first embodiment, where a set of the anomaly-removal Generator network were defined by training a Generative Adversarial Network that included: the anomaly-removal Generator network; an anomaly-addition Generator network; a first Discriminator network; and a second Discriminator network. The first Discriminator network configured to discriminate between: real images that were labeled as depicting at least part of another anomaly of the particular type of biological anomaly; and fake images generated at least in by the anomaly-addition Generator network. The anomaly-addition Generator network may have, during training, received feedback based on first discrimination results generated by the first Discriminator network. The second Discriminator network may be configured to discriminate between: real images that that were labeled as not depicting any biological anomaly of the particular type of biological anomaly; and fake images generated by the anomaly-removal Generator network. The anomaly-removal Generator network may have, during training, received feedback based on first discrimination results generated by the first Discriminator network.

In a sixth embodiment, a method may include the method of the first embodiment and further: training the anomaly-removal Generator network by training a Generative Adversarial Network (GAN) by: inputting, to an anomaly-removal Generator network, a real anomaly-present image that depicts at least part of the subject and depict at least part of another biological anomaly of the particular type of biological anomaly; generating, using at least the anomaly-removal Generator network and the real anomaly-present image, a fake anomaly-absent image; performing, using a Discriminator network of the GAN, a discrimination to predict whether the fake anomaly-absent image corresponds to a true image of an actual sample or a fake image; and adjusting one or more weights of the anomaly-removal Generator network based on the discriminations performed by the Discriminator network. In a seventh embodiment, a method may include the method of the sixth embodiment and further: inputting, to the anomaly-removal Generator network of the GAN, the fake anomaly-absent image; generating, using an anomaly-addition Generator network and the fake anomaly-absent image, a cycled fake anomaly-present image; comparing the cycled fake anomaly-present image to the real anomaly-present image; and determining a cycle loss based on the comparison of the cycled fake anomaly-present image to the real anomaly-present image.

In an eighth embodiment, a method may include the method of any of the first through seventh embodiments and further: pre-processing the medical image to adjust a distribution of each of one or more color channels, where the modified image is generated based on the pre-processed medical image.

In a ninth embodiment, a method may include the method of any of the first through eighth embodiments and further: pre-processing the medical image to perform a segmentation of a particular organ, where the modified image is generated based on the pre-processed medical image.

In a tenth embodiment, a method may include the method of any of the first through ninth embodiments, where estimating the size of the biological anomaly includes: subtracting the modified image from the medical image.

In an eleventh embodiment, a method may include the method of any of the first through tenth embodiments, where the particular type of biological anomaly is a lesion or tumor.

In a twelfth embodiment, a method may include the method of any of the first through eleventh embodiments, where the medical image includes a CT image, x-ray image or MRI image.

In a thirteenth embodiment, a method may include the method of any of the first through twelfth embodiments, where the medical image includes a three-dimensional image.

In a fourteenth embodiment, a method may include the method of any of the first through thirteenth embodiments, where the anomaly-removal Generator network includes a convolutional neural network.

In a fifteenth embodiment, a method may include the method of any of the first through fourteenth embodiments, where the training data set lacked any identification of a boundary, area or volume of any depicted anomaly of the particular type of biological anomaly.

In a sixteenth embodiment, a method is provided that includes: availing, by a user device and to a computing system, a medical image corresponding to a subject and depicting a part of a biological anomaly, the biological anomaly being of a particular type of biological anomaly; and receiving, at the user device and from the computing system, an estimated size of the biological anomaly, where the computing system determined the estimated size by: generating a modified image based on the medical image and using an anomaly-removal Generator network, the anomaly-removal Generator network having been trained using a training data set that lacks annotations of the particular type of biological anomaly; and determining the estimated size of the biological anomaly based on the medical image and the modified image.

In a seventeenth embodiment, a method may include the method of the sixteenth embodiment and further: selecting a diagnosis or treatment recommendation for the subject based on the estimated size.

In a eighteenth embodiment, a method may include the method of the seventeenth embodiment and further: conveying the selected diagnosis or treatment recommendation to the subject.

In a nineteenth embodiment, a method may include the method of any of the sixteenth through eighteenth embodiments and further: collecting the medical image using a medical imaging system.

A twentieth embodiment includes use of an estimated size of a biological anomaly depicted in a medical image in treatment of a subject, where the estimated size is provided by a computing device performing a set of actions including: generating, by the computing system, a modified image based on the medical image and using an anomaly-removal Generator network, the anomaly-removal Generator network having been trained using a training data set identified as lacking any annotations of the particular type of biological anomaly; and estimating, by the computing system, the size of the biological anomaly based on the medical image and the modified image.

A twenty-first embodiment includes a system including: one or more data processors; and a non-transitory computer readable storage medium containing instructions which, when executed on the one or more data processors, cause the one or more data processors to perform part or all of one or more methods disclosed herein (e.g., a method of any of the first through nineteenth embodiments).

A twenty-second embodiment includes a computer-program product tangibly embodied in a non-transitory machine-readable storage medium, including instructions configured to cause one or more data processors to perform part or all of one or more methods disclosed herein (e.g., a method of any of the first through nineteenth embodiments).

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The present disclosure is described in conjunction with the appended figures.

Figure 1:
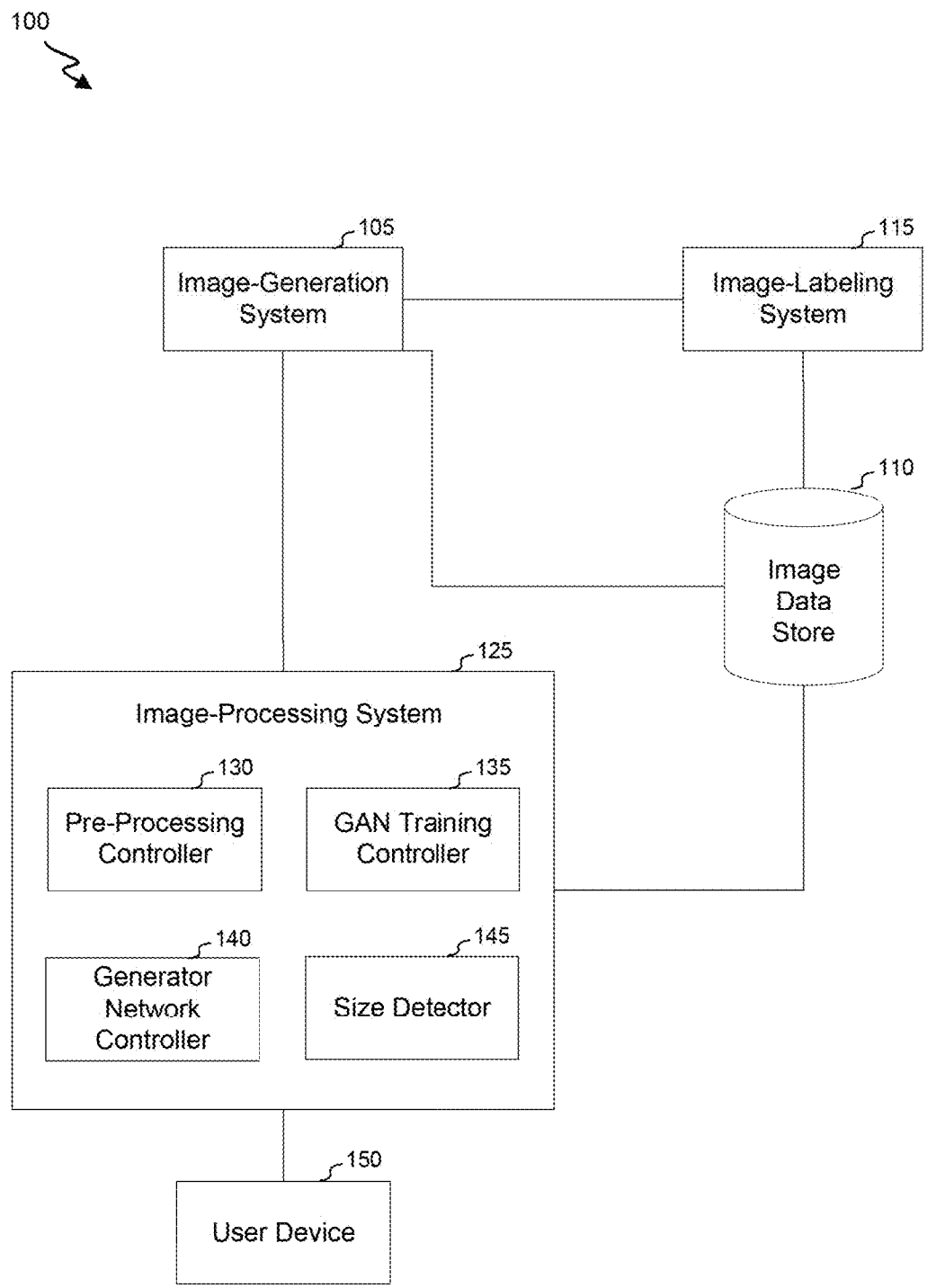
FIG. 1 shows an exemplary biological-anomaly-characterizing network according to some embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

Systems, methods and software disclosed herein facilitates estimating a size of a biological abnormality, such as a tumor. More specifically, an anomaly-removal Generator neural network is trained to receive a real image associated with a particular context (e.g., a particular slice level for a particular subject and/or a particular biological region for a particular subject) and to generate a corresponding fake image associated with a same or different context (e.g., a different slice level for the particular subject, a same slice level for the particular subject, or a same particular biological region for the particular subject). While the corresponding fake image may mirror the real image with regard to some aspects (e.g., the particular subject), the neural network may be configured such that the corresponding fake image lacks part or all of a depiction of a given type of biological anomaly that is depicted in the real image. For example, both the real and fake images may include a three-dimensional image of the lungs, while the real image may depict a tumor while the fake image does not. Thus, a size of the biological anomaly is estimated by subtracting the fake image from the real image (e.g., and determining how many pixels or voxels in a difference image exceed a threshold).

I.A. Generative Adversarial Network Used to Train Anomaly-Removal Generative Network The anomaly-removal Generator network may include parameters learned while training a Generative Adversarial Network (GAN). The GAN further includes a Discriminator network configured to predict whether an input image is fake (generated by the anomaly-removal Generator network) or real (depicting an actual image collected from a subject). Feedback based on the accuracy of these predictions can be provided to the anomaly-removal Generator network.

In some instances, the GAN that is used to train the anomaly-removal Generator network includes a Cycle-GAN. The Cycle-GAN includes multiple Generator networks and multiple Discriminator networks. In addition to the anomaly-removal Generator network, the Cycle-GAN further includes an anomaly-addition Generator network configured and trained to receive a real anomaly-absent image that does not depict any biological anomaly of the particular type and to generate a fake anomaly-present image that depicts a biological anomaly of the particular type. The Cycle-GAN also includes a first Discriminator network that predicts whether images (that truly do not depict a biological anomaly of the particular type or that were modified to lack any depiction of the biology anomaly of the particular type) are real or fake. The accuracy of the predictions can be used to provide feedback to the anomaly-removal Generator network. The Cycle-GAN can also include a second Discriminator network that predicts whether images (that truly depict a biological anomaly of the particular type or that were modified to include a biology anomaly of the particular type) are real or fake. The accuracy of the predictions can be used to provide feedback to the anomaly-addition Generator network.

In some instances, a GAN that is used to train the anomaly-removal Generator network includes a Recycle-GAN. Like the Cycle-GAN the Recycle-GAN includes multiple Generator networks (e.g., an anomaly-removal Generator network and an anomaly-addition Generator network) and multiple Discriminator networks (e.g., a Discriminator network configured to discriminate between real and fake anomaly-absent images and a Discriminator network configured to discriminate between real and fake anomaly-present images). Additionally, the Recycle-GAN includes one or more Predictor networks that generate images associated with a different context relative to images input to the Predictor networks.

A first Predictor network in the Recycle-GAN may receive one or more images that depict a biological anomaly of a particular type (e.g., a tumor, lesion, or plaque) and are associated with a particular subject and one or more slice levels, and the first Predictor may generate an output corresponding to a predicted different-context image associated with the particular subject. Each modified image may correspond to a different perspective, imaging modality, location, zoom and/or slice as compared to a perspective, imaging modality, location, zoom and/or slice relative to the image(s) received by the Predictor network. Notably, the one or more images that depict the biological anomaly and are received by the first Predictor network can be real or fake. For example, the one or more images may be fake images generated by an anomaly-addition Generator network configured to modify one or more real images (e.g., that lack any depiction of a biological anomaly of a given type) to add a depiction of a biological anomaly of a given type.

Conversely, a second Predictor network in the Recycle-GAN may receive one or more images that lack a depiction of a biological anomaly of a particular type (e.g., that do not depict a tumor) and may generate an output corresponding to a predicted different-context image (e.g., associated with a different perspective, imaging modality, location, zoom and/or slice) that also lack a depiction of a biological anomaly of the particular type. Notably, the one or more images that fail to depict the biological anomaly and are received by the second Predictor network can be real or fake. For example, the one or more images may be fake images generated by an anomaly-removal Generator network configured to modify one or more real images (e.g., that include any depiction of a biological anomaly of a given type) to remove a depiction of a biological anomaly of a given type.

I.B. Anomaly-Size Predictions Using Fake Anomaly-Absent Images

In some instances, the anomaly-removal Generative network is configured to receive a three-dimensional image (that depicts at least part of a biological anomaly) and to generate a fake three-dimensional image (that lacks a depiction at least part of the biological anomaly). A difference between a real image and a fake image may then indicate which voxels are predicted to be part of the biological anomaly. Thus, a size of the biological anomaly can be predicted based on a quantity of voxels for which a difference between the real and fake images exceeds a threshold.

Alternatively, the anomaly-removal Generative network may be configured to receive a two-dimensional image (that depicts at least part of a biological anomaly) and to generate a fake two-dimensional image (that lacks a depiction at least part of the biological anomaly). A difference between a real and fake image may then represent a predicted area of the anomaly. However, multiple real images (e.g., corresponding to different slice levels) may be available for a given subject, and multiple fake images may be generated. Areas across the slice levels may then be collectively processed to predict a size and/or volume of the anomaly.

I.C. Advantages

Techniques disclosed herein that relate to using a GAN have strong advantages in reducing the need for manual annotation and improving the objectivity and accuracy of delineating abnormalities on medical images. For example, manually annotating medical images to estimate a volume of a tumor may require an immense amount of time of identifying a border of the tumor in each of multiple consecutive slices. For example, a full-body CT scan of a subject with advanced cancer can include 250 tumors or more. Detecting abnormalities using manual annotation can require thousands of per-image work hours and millions of dollars per tumor.

This time commitment may result in a training set being of a relatively small size and/or with rather small diversity. This manual approach is also error-prone, as it can be difficult for a human annotator to recall details from adjacent slides, which may be informative as to where a boundary of a tumor is on a current slide.

Meanwhile, GAN-based techniques disclosed herein can use a machine-learning model trained using data with high-level labels indicating (for example) whether each image depicts at least a portion of a biological anomaly or not (such that the training data includes binary labels). The training data need not be labeled so as to indicate a location of a given depiction of a biological anomaly, a size of a depicted biological anomaly, a boundary of a biological anomaly, or any other spatial characteristic of a biological anomaly. That is, a training data set may be collected without manual segmentation being performed. Thus, it can be easier to obtain training data, which may result in a larger training data set and higher accuracy of the model. Alternatively or additionally, the binary labeling may reduce the time or financial investment of collecting a training set and/or predicting a size of a biological anomaly.

Further, techniques disclosed herein do not depend on training data sets that include paired data. That is, a Generator network need not be trained on a data set that includes a set of anomaly-absent images and a corresponding "paired" set of anomaly-present images (e.g., associated with a same subject set). Collecting paired images can include collecting—for each subject—images collected from multiple imaging sessions. For example, one or more images from a first imaging session may depict a biological anomaly, while images from a second imaging session may lack the biological anomaly (or the converse). However, predicting whether an anomaly will cease to appear (e.g., in response to treatment) or whether a new anomaly will appear is exceedingly difficult. Thus, obtaining paired images can be highly challenging. Without paired data, it would not be possible to use many existing training techniques (e.g., that use L1 or L2 regularization) to train a neural network to generate a predicted anomaly-absent image based on a real anomaly-present image (e.g., to thereafter predict a size of the anomaly). Meanwhile, techniques disclosed herein—that do not require paired data—can allow larger training data sets (e.g., unpaired training data sets) to be collected, which can result in accurate predictions of a size of a biological anomaly.

II. Exemplary Biological-Anomaly-Characterizing Network

FIG. 1 shows an exemplary biological-anomaly-characterizing network 100 according to some embodiment. Biological-anomaly-characterizing network 100 includes an image-generation system 105 configured to collect one or more images of a part of a body of a subject. Each image may depict at least part of one or more biological structures (e.g., at least part of one or more tumors, at least part of one or more lesions, at least part of one or more plaques, and/or at least part of one or more organs). The subject may include a person who has been diagnosed with or has possible diagnosis of a particular disease. The particular disease may include cancer or a particular type of cancer. The one or more images may depict (for example) all or part of a lung, a brain, or a liver.

II.A. Image-Generation System

The image(s) include one or more two-dimensional images and/or one or more three-dimensional images. A two-dimensional image depicts a cross-sectional slice (e.g., a horizontal slice) of a subject or a portion of a cross-sectional slice of a subject. A three-dimensional image depicts a three-dimensional region of a subject. A three-dimensional image may be generated by stacking or combining multiple two-dimensional images (corresponding to slices of the subject taken at multiple slice levels). Thus, as used herein, a "region" of a subject that is depicted in an image refers to a three-dimensional volume within the subject, and a "slice" of a subject that is depicted in an image refers to a two-dimensional cross-section of the subject.

Image-generation system 105 may include (for example) a computed tomography (CT) scanner, x-ray machine or a magnetic resonance imaging (Mill) machine. The image(s) may include a radiological image, CT image, x-ray image or MM image. The image(s) may have been collected without a contrast agent was administered to the subject or after a contrast agent was administered to the subject. In some instances, image-generation system 105 may initially collect a set of two-dimensional images and generate a three-dimensional image using the two-dimensional images.

The image(s) collected by image-generation system 105 may be collected without a contrast agent having been administered to a subject or after a contrast agent was administered to a subject. The subject being imaged may include a subject who was diagnosed with cancer, who has a possible diagnosis or preliminary diagnosis of cancer and/or who has symptoms consistent with cancer or a tumor.

Image-generation system 105 may store the collected images in an image data store 110, which may include (for example) a cloud data store. Each image may be stored in association with one or more identifiers, such as an identifier of a subject and/or an identifier of a care provider associated with the subject. Each image may further be stored in association with a date on which the image was collected.

II.B. Image-Labeling System

One or more images are availed to an image-labeling system 115, which facilitates identifying a label for each of the one or more images. The label indicates whether the image depicts a biological anomaly. It will be appreciated that a label that indicates that an image depicts a biological anomaly may indicate that the image depicts part of a biological anomaly (e.g., a slice of the biological anomaly).

Image-labeling system 115 may identify the label based on input received by a human user. For example, image-labeling system 115 may present each of the one or more images on a display and may receive input (e.g., a click of a given button, a selection of a pull-down option, entry of text, etc.) that indicates whether each image depicts a biological anomaly (e.g., depicts at least part of a tumor).

Image-labeling system 115 may alternatively identify the label using an automated image-processing technique. For example, image-labeling system 115 may predict that an image depicts a biological anomaly when at least a threshold percentage or at least a threshold number of voxels or pixels have an intensity above a predefined threshold. The threshold may be defined to distinguish between portions of the body that absorbed a contrast agent (e.g., a tumor) and other portions of the body. As another example, image-labeling system 115 may identify labels based on sources of an image. For example, a first source of images may include a database, library, or medical-provider system that is associated with confirmed oncology cases, and a second source of images may include a database, library, or medical-provider system that is associated with healthy subjects.

Image-labeling system 115 may update image data store 110 to include one or more labels that indicate whether each of the one or more images includes a depiction of a biological anomaly.

II.C. Image-Processing System

An image-processing system 125 (e.g., which may include a remote and/or cloud-based computing system) is configured to predict, for each of one or more biological anomaly of a given type, a size of the depicted anomaly.

II.C.1. Pre-Processing Controller

More specifically, image-processing system 125 can be configured to train a GAN; to subsequently use a trained anomaly-removal Generator network from the GAN to process an input image (that depicts a particular type of biological anomaly) to generate a modified image (that does not depict the particular type of biological anomaly); and to predict a size of the biological anomaly using the input and modified images.

More specifically, image-processing system 125 includes a pre-processing controller 130, which initiates and/or controls pre-processing of an image. The pre-processing may include (for example) converting the image to a predefined format, resampling the image to a predefined sampling size, resampling the image to a predefined size (e.g., no greater than a specified number of pixels or voxels each of one, more, or all dimensions), cropping the image to a predefined size, generating a three-dimensional image based on multiple two-dimensional images, generating one or more images having a different (e.g., target) perspective, adjusting (e.g., standardizing or normalizing) intensity values, and/or adjusting color values.

Pre-processing may include converting adjusting one or more color channels. For example, a greyscale image can be converted to include one or more color channels.

In some instances, for each image, pre-processing controller 130 segments the image by detecting a region that depicts at least part of a particular type of biological organ (e.g., a lung). The segmentation may be performed using (for example) a neural network (e.g., convolutional neural network) trained using supervised learning. The image may be modified to include only the portion of the image identified as depicting the particular type of biological organ. For example, intensity values of all other pixels or voxels may be set to zero or to a not-a-number value.

II.C.2. GAN Training Controller

Image-processing system 125 include a GAN training controller 135, which trains a GAN using the labeled images. The GAN may be trained using a training set that includes a first set of images that each depict at least one biological anomaly (which can include depicting at least part of the biological anomaly), where the at least one biological anomaly is of a particular type of anomaly. For example, an image may include a three-dimensional image that depicts an entirety of a tumor; a two-dimensional image that depicts a full cross-section of a tumor; a three-dimensional image that depicts part of a tumor; or a two-dimensional image that depicts part of a cross-section of a tumor. The training set also includes a second set of images, where each image in the second set does not depict any biological anomaly of the particular type of anomaly. Each image in the data set may be associated with a label that indicates whether it depicts a biological anomaly of the particular type, though the training set need not include segmentation or annotation data that indicates where, within an image, an anomaly is depicted. Images within the training set may all depict at least part of (or all of) a particular organ, or the training set may include images that depict different portions of the body.

The GAN can include a Cycle-GAN or Recycle-GAN. The GAN includes an anomaly-removal Generator neural network trained to receive an image that depicts a particular type of biological anomaly (e.g., a tumor) and to output a modified (fake) image that does not depict the particular type of biological anomaly. The anomaly-removal Generator network can include one or more convolution layers, a U-net, or a V-net. In some instances, the anomaly-removal Generator network includes a feature-extracting encoder (that includes one or more convolution layers), a transformer (that includes one or more convolution layers), and a decoder (that includes one or more convolution layers). The modified image and the received image may share various contexts (e.g., area/volume depicted, size, depicted organ(s), etc.). A Discriminator network receives fake images from the anomaly-removal Generator network and also receives real images that do not depict the particular type of biological anomaly. The Discriminator network can include one or more convolution layers and an activation layer. The Discriminator network predicts, for each image, whether the image is real or fake. Feedback may be sent to the anomaly-removal Generator network based on the accuracy of the Discriminator network's predictions.

Training the GAN can include using one or more loss functions. The training may include introducing penalties when a Discriminator network of the GAN incorrectly predicts that a real image is a fake image (or the reverse). The training may additionally or alternatively include introducing a cycle loss. A cycle loss may be calculated by double-processing an original image that includes (or alternatively lacks) a depiction of an anomaly of a particular type with one Generator network of the GAN to remove (or alternatively add) such a depiction so as to generate a modified image that is predicted to lack (or alternatively include) a depiction of an anomaly of the particular type and to then process the modified image with another Generator network of the GAN to add (or alternatively remove) a/the depiction of the anomaly to generate a cycled image. The loss may scale with the differences between the original and cycled image.

II.C.2.a. Cycle-GAN

Figure 2:
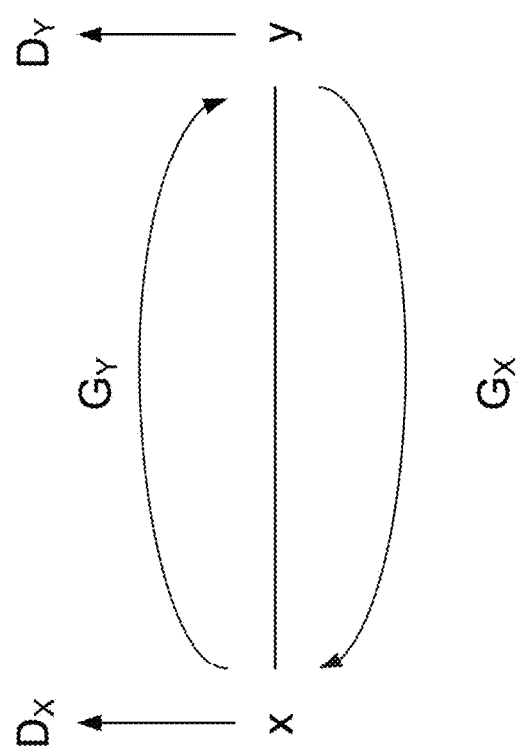
FIG. 2 shows a representation of networks and network connections in a Cycle-Generative Adversarial Network (GAN) according to some embodiments of the invention.
Figure 3:
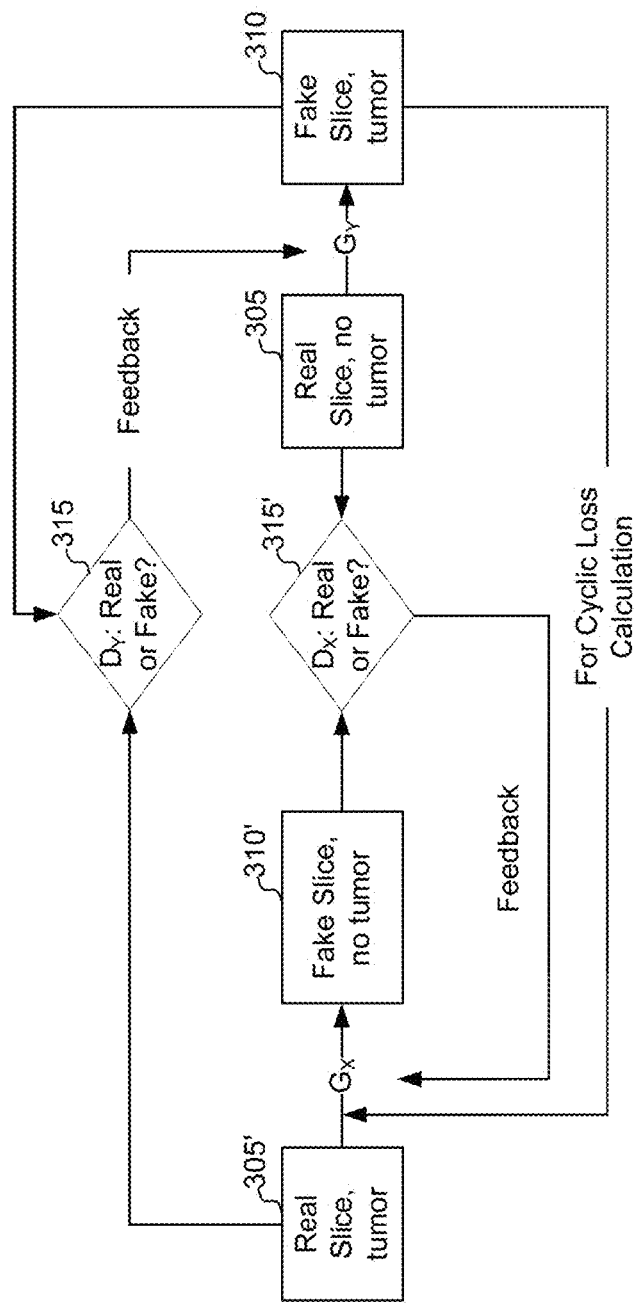
FIG. 3 illustrates a flow of generating fake images and discriminating real versus fake images using a Cycle-GAN according to some embodiments of the invention.

The GAN trained by GAN training controller 135 may include a Cycle-GAN that includes multiple Generator networks and multiple Discriminator networks. FIG. 2 shows a representation of networks and network connections in a Cycle-GAN, and FIG. 3 illustrates a flow of generating fake images and discriminating real versus fake images using a Cycle-GAN. In this depiction, each rectangular box represents a (real or fake) image, and each diamond represents a determination.

The X and Y domains pertain to different types of images. For the present instance, the Y domain corresponds to images depicting a particular type of biological anomaly (e.g., a lesion), and the X domain corresponds to images lacking a depiction of the particular type of biological anomaly.

In addition to including an anomaly-removal Generator network, the Cycle-GAN also includes an anomaly-additional Generator network configured and trained to modify an image to add a depiction of a biological anomaly of a particular type. The anomaly-addition Generator network can include one or more convolution layers, a U-net, or a V-net. In some instances, the anomaly-addition Generator network includes a feature-extracting encoder (that includes one or more convolution layers), a transformer (that includes one or more convolution layers), and a decoder (that includes one or more convolution layers). An architecture of the anomaly-addition Generator network may be the same as an architecture of the anomaly-removal Generator network.

The anomaly-addition Generator network and/or the anomaly-removal Generator network may be collectively trained using cycle-consistent loss or cyclic loss. In this instance, an original image is compared to an image produced by processing first by one Generator network and then by the other Generator network, and the loss may be larger when the image differences are more dramatic. For example, an original image 305 may depict a subject's lungs and not include any depiction of a tumor. This original image may be processed by the anomaly-addition Generator network to produce a fake tumor-present image 310, which may then be processed by the anomaly-removal Generator network to produce a fake tumor-absent image 310'. Loss may be calculated in a manner such that the loss scales with the degree of difference between the original image and the fake tumor-absent image. Cycle-consistent loss may facilitate reducing the occurrence or extent of mode collapse (where a Generator begins to generate a stereotyped of image that may not correspond to the original image). However, minimizing the cyclic loss in a Cycle-GAN does not guarantee that, once mapped from one domain to another domain, an image will not get stuck in a single 'mode' with only a few pixels changing from one image to another. For example, an anomaly-addition Generator network may generate a fake anomaly-present image that looks nearly identical to an input (e.g., real) anomaly-present image. Similarly, an anomaly-removal Generator network may generate a fake anomaly-absent image that looks nearly identical to an input (e.g., fake) anomaly-present image. Thus, in some instances, a loss may be calculated based on a combination of a cyclic loss and a non-cyclic loss (e.g., with the non-cyclic loss being determined based on a degree to which a Discriminator network can distinguish between real and fake images).

In addition to including a Discriminator network that discriminates (at block 315') between real and fake images that do not depict an anomaly of a particular type (e.g., real tumor-absent image 305 and fake tumor-absent image 310'), the Cycle-GAN also includes another Discriminator network that discriminates (at block 315) between fake and real images that do depict an anomaly of a particular type (e.g., real tumor-present image 305' and fake tumor-present image 310). Each of the Discriminator network and the other Discriminator network can include one or more convolution layers and an activation layer. An architecture of the Discriminator network may be the same as an architecture of the other Discriminator network.

Each Generator network ($G_X$ and $G_Y$) is configured to receive an image from one domain and generate a corresponding image in another domain (the other domain being indicated by the subscript). $G_Y$ is configured to receive a real image 305 that does not include any depiction of a particular type of biological anomaly (X domain) and to generate a corresponding fake image 310 that includes a depiction of the particular type of biological anomaly (Y domain). Meanwhile, $G_X$ is configured to receive a real image 305' that includes a depiction of a particular type of biological anomaly (Y domain) and to generate corresponding image 310' that lacks any depiction of the particular type of biological anomaly (X domain).

Each Discriminator network processes fake images (generated by a Generator network) to predict whether the image is real. Each Discriminator network similarly processes real images to predict whether the image is real. Each Discriminator network is domain-specific. Thus, for example, Discriminator network $D_Y$ generates predictions (at block 315) for real or fake images that are known (e.g., via metadata associated with the images) to depict a biological anomaly or that are being generated (by anomaly-addition Generator network $G_Y$ or Predictor network $P_Y$) to depict a biological anomaly of a particular type. Similarly, Discriminator network $D_X$ generates predictions (at block 315') for real or fake images that are known (e.g., via metadata associated with the images) as lacking depictions of a biological anomaly of a given type or that are being generated (by anomaly-removal Generator network $G_X$ or Predictor network $P_X$) to lack any depiction of a biological anomaly of a particular type.

A discrimination result that corresponds to chance indicates that the Discriminator network is unable to distinguish between real and fake images and thus that the fake images are likely of high quality. Results from the discrimination performed by a Discriminator network operating in a given domain can be used, in a learning process, to adjust parameters of a corresponding Generator network.

A Cycle-GAN may be used to process three-dimensional images. The Generator and Discriminator networks may then include three-dimensional convolutional layers. The networks can then be configured to learn how features extending across slices are predictive of whether and where an image depicts a particular type of biological anomaly. Alternatively or additionally, a three-dimensional image may be reshaped into a one-dimensional vector and processed using two-dimensional convolutional layers.

It will be appreciated that processing three-dimensional images using neural networks can use a substantial amount of memory. Thus, in instances where a biological region of interest (e.g., an organ) are large, a pre-processing technique can be performed to segment the organ to reduce the size. Alternatively or additionally, the image(s) may be pre-processed to reduce a spatial resolution of the image(s). For example, segmenting the organ and resampling to a reduce a resolution may be useful when an organ of interest are the lungs (given the relatively large size of the lungs as compared to other organs).

II.C.2.b. Recycle-GAN

Figure 4:
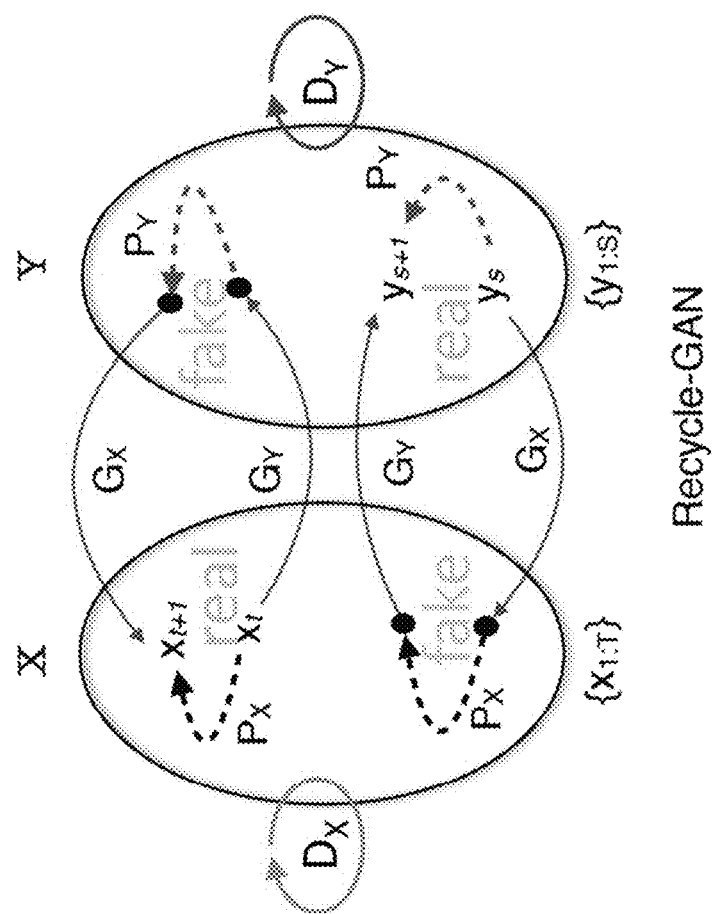
FIG. 4 illustrates various networks and network connections in a Recycle-GAN according to some embodiments of the invention.

The GAN trained by GAN training controller 135 may include a Recycle-GAN that includes multiple Generator networks, multiple Discriminator networks, and multiple Predictor networks. FIG. 4 shows a representation of networks and network connections in a Recycle-GAN. In addition to the networks depicted in the Cycle-GAN in FIG. 2, the Recycle-GAN depicted in FIG. 4 includes multiple Predictor networks, $P_X$ and $P_Y$.

Each Predictor network can include one or more convolution layers and/or a U-net. Each Predictor network predicts an image obtained in a context different than one or more images input to the Predictor network. For example, a Predictor network may include a convolutional neural network and/or may generate an image that corresponds to a different perspective, imaging modality, location, zoom, and/or slice as compared to a perspective, imaging modality, location, zoom, and/or slice relative to that of the image(s) received by the Predictor network. For example, Predictor $P_X$ can predict an image of a slice $x_{t+1}$ based on an image of a neighboring slice $x_t$, and $P_Y$ can predict an image of a slice $y_{s+1}$ based on an image of a neighboring slice $y_s$.

Figure 5:
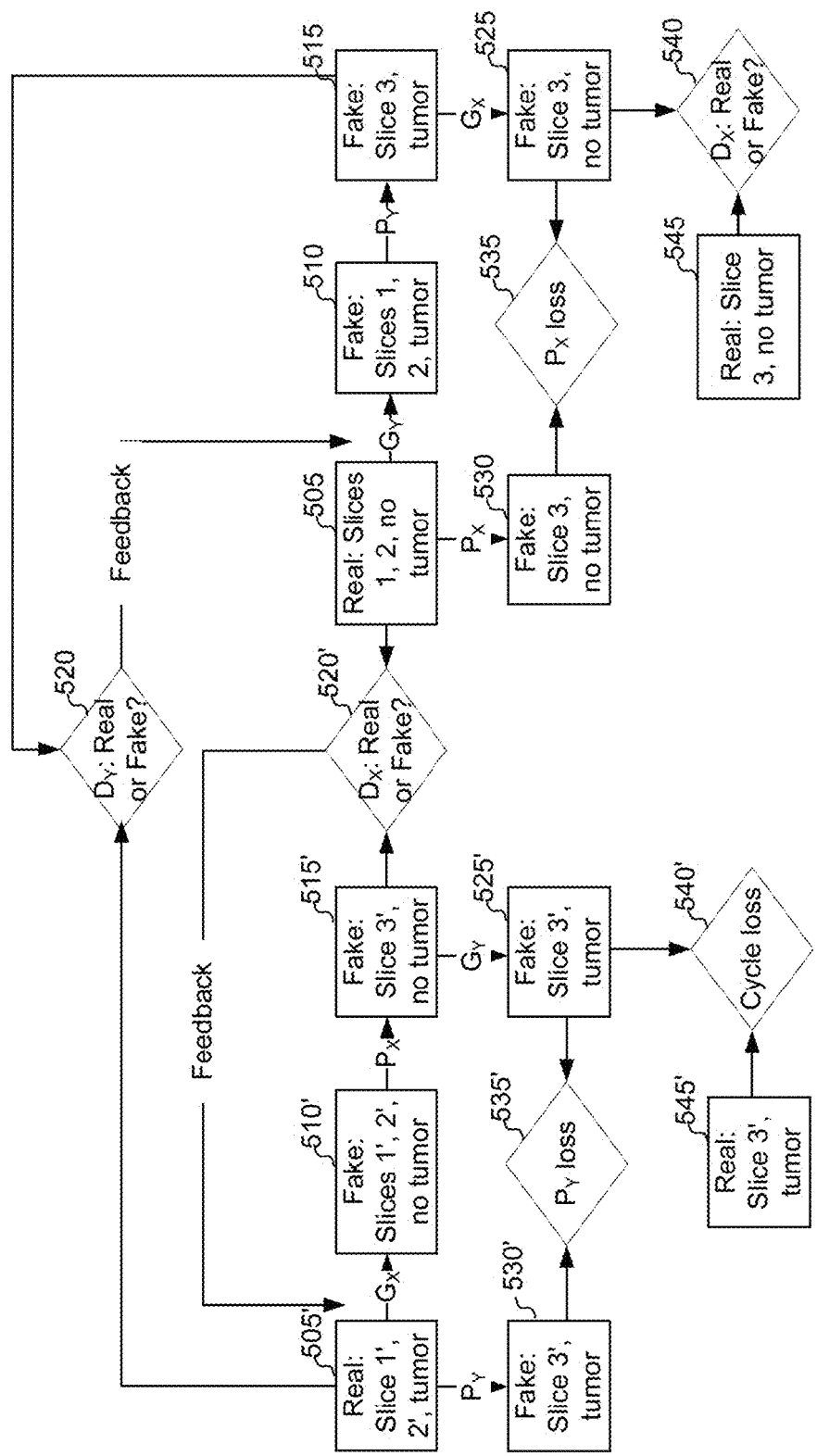
FIG. 5 illustrates how various fake images may be generated and assess in a neural-network configuration according to some embodiments of the invention.

FIG. 5 illustrates how various fake images may be generated and assessed in a neural-network configuration according to some embodiments of the invention. In this depiction, each rectangular box represents a (real or fake) image, and each diamond represents a determination.

Each of a first and second real anomaly-absent images 505 depict a first slice and second slice (respectively) of a sample and lack any depiction of a biological anomaly of a particular type. $G_Y$ uses first and second real anomaly-absent images 505 to generate first and second fake anomaly-present images 510 of the first and second slices by adding a depiction of a biological anomaly of the particular type. $P_Y$ uses first and second fake anomaly-present images of the first slice 510 to generate a third fake anomaly-present image 515 of a third slice. At block 520, $D_Y$ predicts whether third fake anomaly-present image 515 is real or fake. $D_Y$ further predicts whether first and second real anomaly-present images 505' of other first and second slice of another sample are real or fake. While not shown, $D_Y$ can further predict whether first and second fake anomaly-present images 505 of the first and second slices are real or fake. Feedback from the discriminations (e.g., based on a recall statistic) can be fed back to $G_Y$.

Third fake anomaly-present image 515 of the third slice is fed to $G_X$, which generates a cycled fake anomaly-absent image 525 of the third slice. $P_X$ uses first and second real anomaly-absent images 505 to generate another fake anomaly-absent image 530 of the third slide. At block 535, the fake anomaly-absent images 525 and 530 (corresponding to the third slice) can be compared to each other to identify a loss of $P_X$. Further, at 540, cycled fake anomaly-absent image of the third slide 525 can be compared to a third real anomaly-absent image 535 of the third slice to determine a cycle loss.

FIG. 5 represents symmetrical actions. More specifically, first and second real anomaly-present images 505' of the other first and second slices of the other sample are fed to $G_X$, which generates first and second fake anomaly-absent images 510' for the other first and second slices. $P_X$ can uses first and second fake anomaly-absent images 510' to generate a third fake anomaly-absent image 515' of a third slice of the other sample 515'. At block 520', $D_X$ predicts whether third fake anomaly-absent image 515' is real or fake. $D_X$ further predicts whether first and second real anomaly-absent image 505 are real or fake. While not shown, $D_X$ can further predict whether first and second fake anomaly-absent image 510' of the other first and second slices are real or fake. Feedback from the discriminations (e.g., based on a recall statistic) can be fed back to $G_X$.

Third fake anomaly-absent image 515' of the other third slice is fed to $G_Y$, which generates a cycled fake anomaly-present image 525' of the third slice. $P_Y$ uses first and second real anomaly-present images 505' to generate another fake anomaly-present image 530' of the other third slide. At block 535', the fake anomaly-present images 525' and 530' (corresponding to the other third slice) can be compared to each other to identify a loss of $P_Y$. Further, at 540', cycled fake anomaly-present image 525' of the other third slide can be compared to a third real anomaly-present image 535' of the third slice to determine a cycle loss.

Figure 6A:
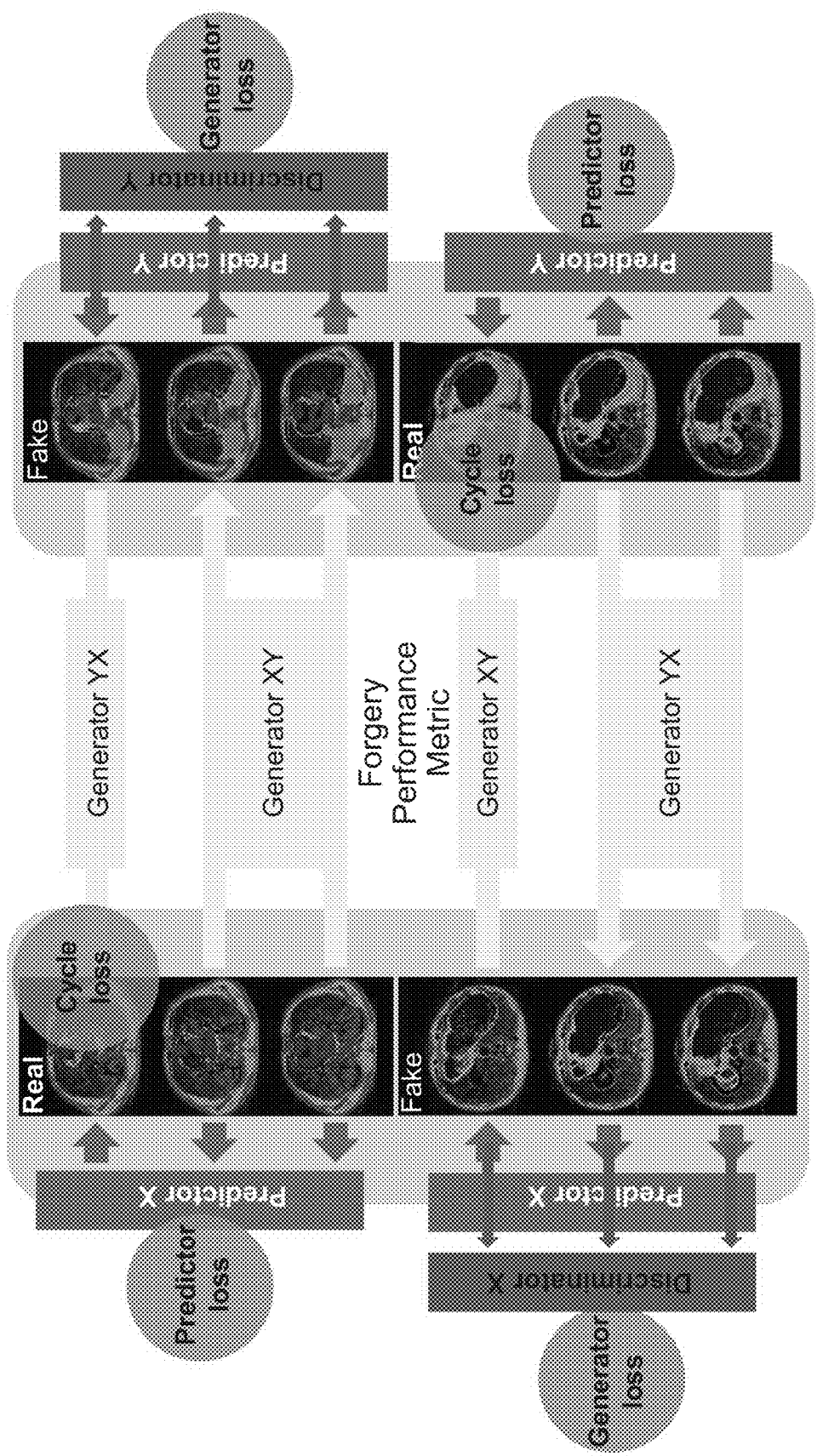
FIGS. 6A-6B illustrate how various types of loss can arise in a neural-network configuration according to some embodiments of the invention.
Figure 6B:
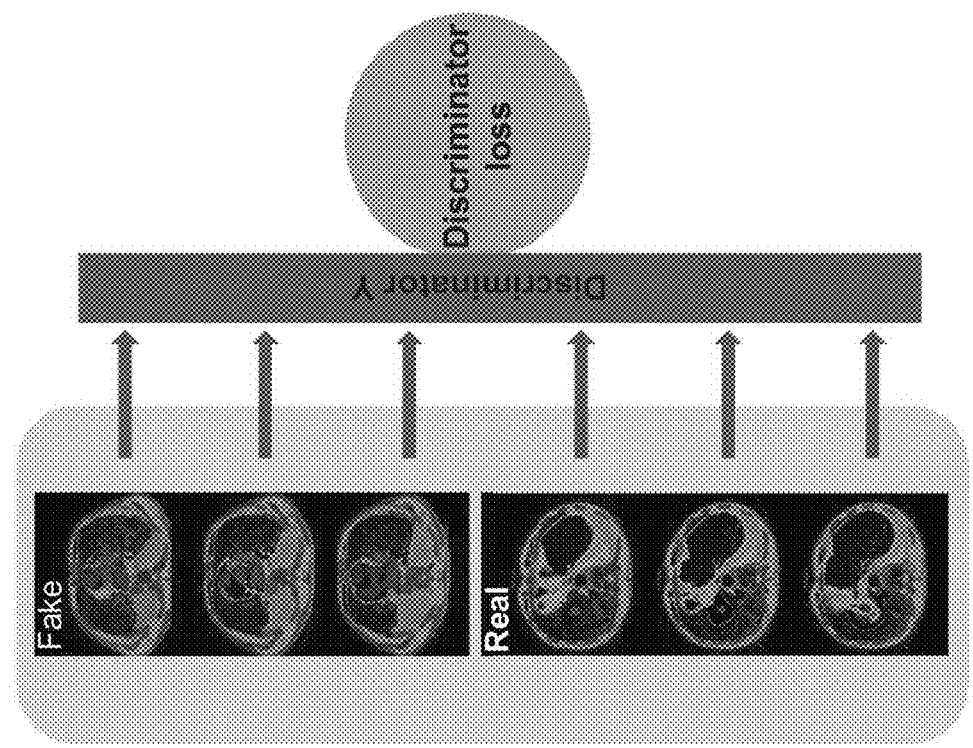
Figure 6B:
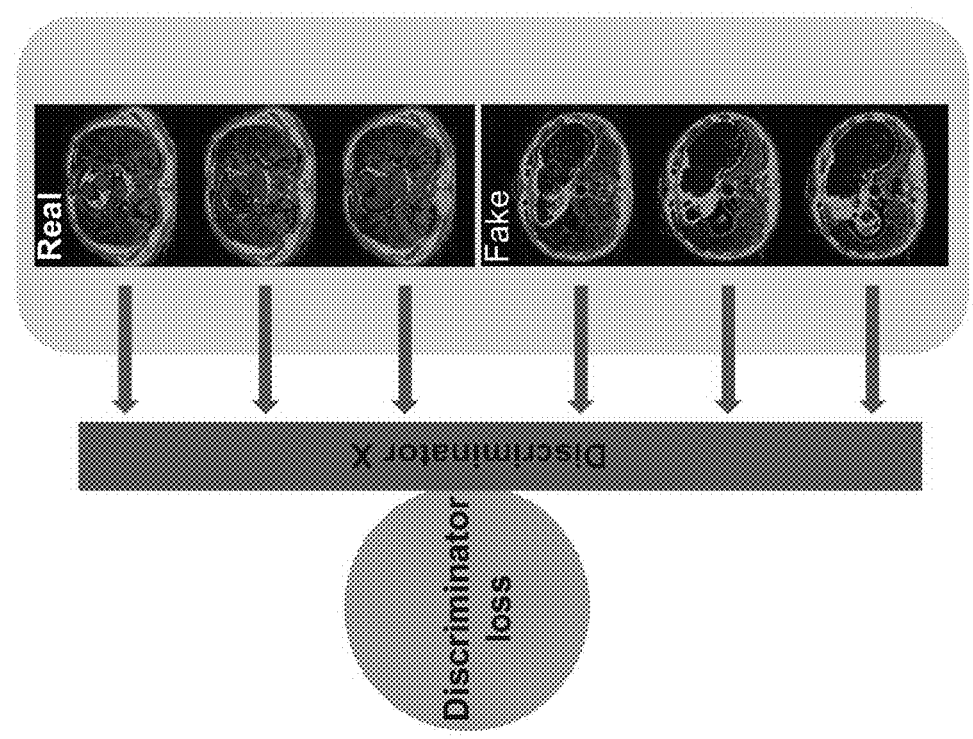

FIG. 6A-6B illustrate how various types of loss can arise in a Recycle-GAN. As illustrated in FIG. 6A, even though the Discriminator and Predictor networks participate in the overall training and backpropagation, their weights need not be updated in response to discrimination results. Rather, discrimination results can selectively trigger updating of only weights of a corresponding Generator network. However, by virtue of backpropagation flowing through the Discriminator network, its weights are taken into account in the Generators training, which gives them some advantage over the Discriminators. (FIG. 6A.)

Even though the Generator networks are used to generate fake images, the Generator networks are before the corresponding Discriminators in the architecture. Thus, the Generator weights may be inaccessible to the Discriminator training. (FIG. 6B.)

A Recycle-GAN may be used to process sets of two-dimensional images. The Generator and Discriminator networks may then include two-dimensional convolution layers. The predictor network facilitates introducing weak coherence between domains (e.g., slices) so that networks can learn anatomical organization (e.g., across the volume encompassed by multiple slices) and can then more realistically generate fake images (that lack that anatomical organization by virtue of being only 2D slices) and discriminate between real and fake images (for similar reasons) which can then facilitate even further improving the generation of fake images.

II.C.3. Generator Network Controller

While GAN training controller 135 can train a full GAN network, a Generator network controller 140 may thereafter use a single Generator network from the GAN to assess medical images. More particularly, the single Generator network can include one that receives an input image that depicts a particular type of biological anomaly (e.g., tumor or lesion) and generates a modified image that lacks a depiction of the particular type of biological anomaly.

II.C.4. Size Detector

A size detector 145 can then be configured to receive each of the one or more modified images generated by anomaly-removal Generator network controller 140 (that is to lack a depiction of the particular type of biological anomaly) and the input image (e.g., that depicts that particular type of biological anomaly) and to predict a size of the biological anomaly. For example, size detector 145 may subtract the modified image from the input image. In some instances, size detector 145 may first process the difference image (e.g., to apply one or more spatial filters and/or thresholds).

The predicted size may correspond to a size of an area (e.g., when an input image is a two-dimensional image) or a size of a volume (e.g., when an input image is a three-dimensional image) identified in the difference image. For example, size detector 145 may determine for each pixel or voxel, whether an intensity condition was satisfied (e.g., a condition configured to be satisfied when an intensity of the pixel or voxel was not equal to zero or a condition configured to be satisfied when an intensity of the pixel or voxel was within predefined open or closed range). The predicted size may be defined based on a quantity of the pixel or voxel for which the condition was satisfied. Alternatively, a binary image may be generated that indicates—for each pixel or voxel—whether the condition was satisfied. A low-pass spatial filter may then be applied such that pixels or voxels for which the condition was satisfied will be passed through when they are adjacent to other pixels (e.g., of a sufficient quantity and/or shape). The filtered image may include another binary image. The predicted size of the biological anomaly can then be determined by processing the filtered image (e.g., by thresholding, summing or averaging across pixels or voxels in the filtered image).

In some instances, size detector 145 processes multiple original and modified two-dimensional images, and size detector 145 predicts the size based on the processing of the multiple images. As one example, a biological-anomaly area may be estimated for each two-dimensional image, and the areas may be aggregated to estimate a volume of the biological anomaly. As another example, multiple input images (e.g., depicting a biological anomaly of a particular type) may be processed to generate a three-dimensional anomaly-inclusive image, and multiple modified images (e.g., lacking a depiction of the biological anomaly of the particular type) may be processed to generate a three-dimensional anomaly-absent image, and size detector 145 can estimate a size of the biological anomaly based on the three-dimensional anomaly-inclusive image and the three-dimensional anomaly-absent image. To illustrate, size detector 145 may subtract the three-dimensional anomaly-absent image from the three-dimensional anomaly-present image. The resulting image may, but need not, be processed (e.g., via a thresholding, filtering and/or smoothing). A size of the biological anomaly (e.g., an area or a volume) can be predicted. In some instances, the predicted size may be based on and/or may depend on a resolution of and/or size of the original and/or modified images. As yet another example, for each of multiple orthogonal dimensions, a real tumor-present image can be accessed, a fake tumor-absent image can be generated, and a predicted tumor depiction can be generated by subtracting the fake tumor-absent image from the real tumor-present image. Size detector 145 may then determine a longest diameter of the predicted tumor depiction, and a longest diameter can be defined to be a maximum of the three longest diameters.

Figure 7:
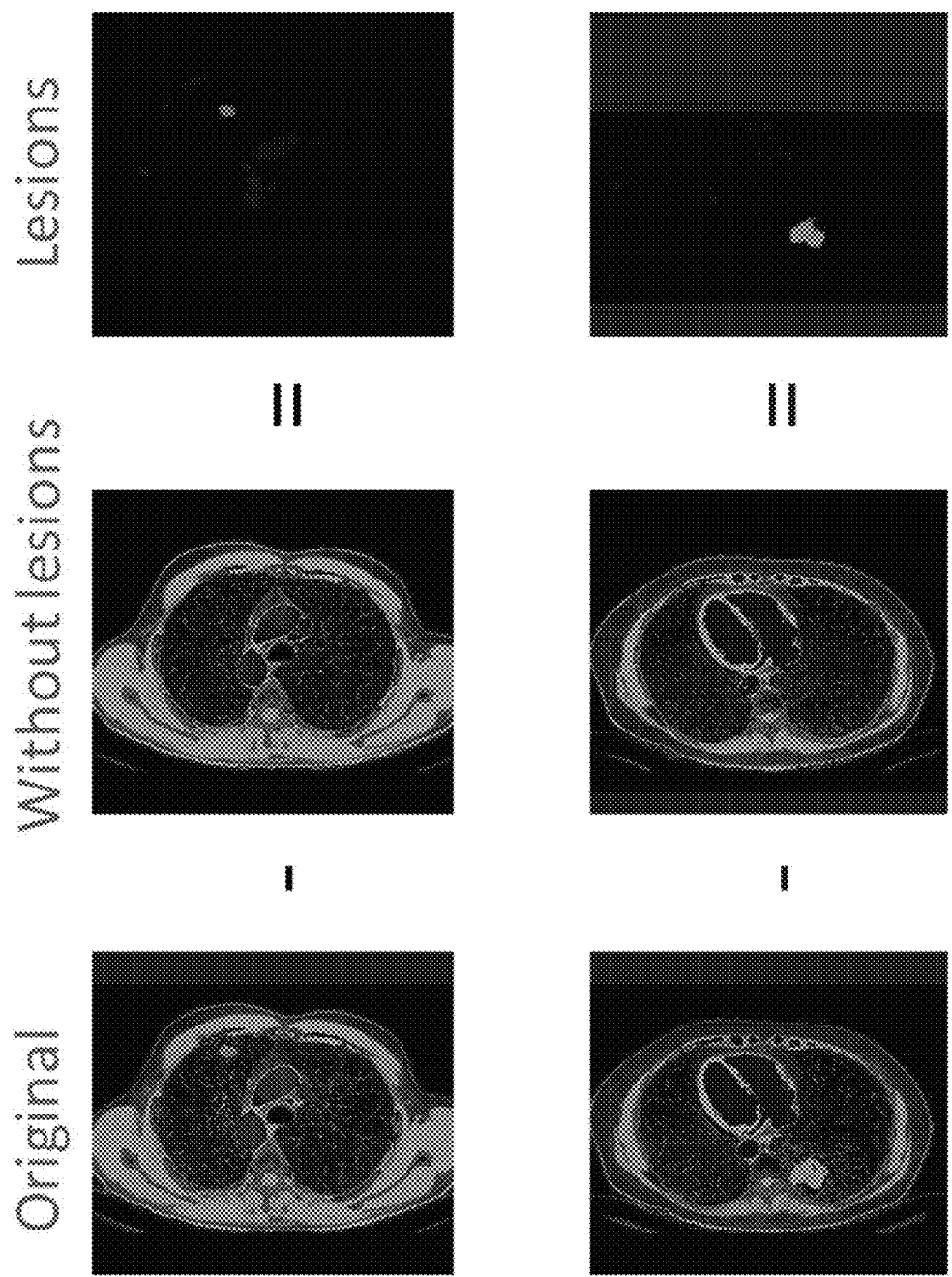
FIG. 7 illustrates how spatial characteristics of a biological anomaly can be estimated based on a comparison between a real and fake image according to some embodiments of the invention.

For example, FIG. 7 illustrates how spatial characteristics of a biological anomaly can be estimated based on a comparison between a real and fake image according to some embodiments of the invention. Specifically, the left images show initial image that include a depiction of a lesion and surrounding tissue. The middle images show fake images generated by a trained anomaly-removal Generator network configured to remove lesions. The right images show a result of subtracting the fake images from the corresponding initial images. These images may be processed to characterize the lesions. For example, pixels having a threshold above a predefined threshold can be counted. The count may be normalized or scaled based on a scale of the image and/or resolution of the image, and the normalized or scaled count can indicate a total lesion size for the imaged slice. In some instances, this process is repeated across images corresponding to different slices, and a tumor volume can be estimated by performing a sum across the images.

In addition to or instead of predicting a size of a biological anomaly based on real and fake images, the real and fake images may be used to segment a biological anomaly depicted in a real image. A segmentation result may identify which portion(s) of the image depict a biological anomaly of the particular type. For example, a segmentation result may include an overlay on an original image, which then indicates which portion(s) of the original image were predicted as depicting a biological anomaly of the particular type.

Image-processing system 125 may return the size (and/or segmentation result) to a user device 150. User device 150 may include a device that requested an estimated size corresponding to a biological anomaly or a device that provided one or more images depicting the biological anomaly User device 150 may be associated with a medical professional and/or care provider that is treating and/or evaluating a subject who is imaged. In some instances, image-processing system 125 may return an estimate of a size of the biological anomaly image-generation system 105 (e.g., which may subsequently transmit the estimated volume to a user device). In some instances, rather than or in addition to outputting the estimated size, image-processing system 125 outputs (e.g., to user device 150) a treatment recommendation. For example, image-processing system 125 may use one or more rules to identify a treatment recommendation at least partly based on the estimated size (e.g., and potentially one or more previous estimated size of the biological anomaly). To illustrate, a rule may include a threshold and may indicate that if an estimated size of a biological anomaly for a given subject is not at least X % less than a previous estimated size of the biological anomaly for the given subject (e.g., associated with a defined time period), a recommendation of changing a treatment strategy is to be considered.

It will be appreciated that, in some instances, biological-anomaly-characterizing network 100 can be used to estimate a size of each of multiple biological anomalies. For example, an anomaly-removal Generator network may be trained to generate a modified image that does not depict any brain lesion, even when an input image depicts multiple images. A difference between the input and modified images may then be used to estimate a cumulative size of the brain lesions.

III. Exemplary Biological-Anomaly-Characterizing Network

Figure 8:
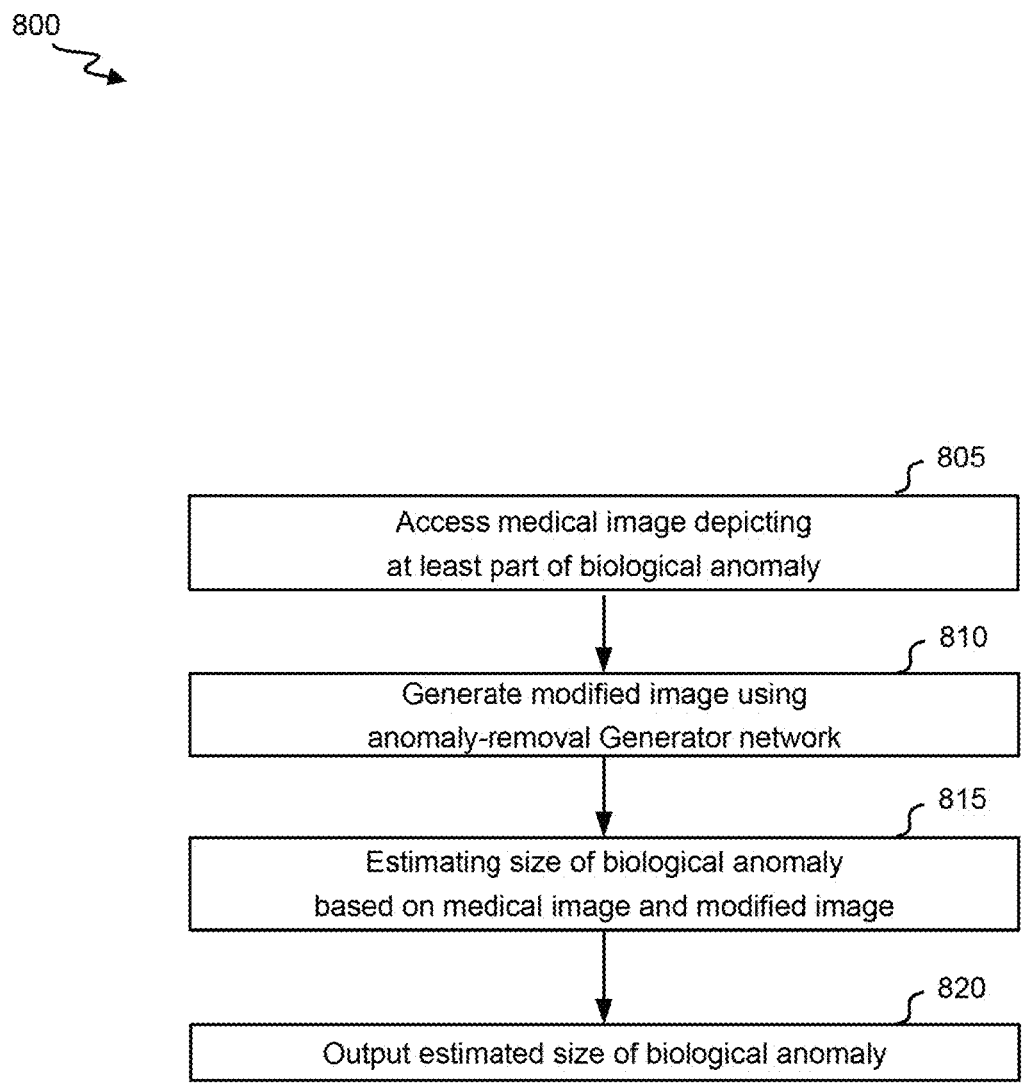
FIG. 8 shows a flowchart of an exemplary process for estimating a size of a biological anomaly.

FIG. 8 shows a flowchart of an exemplary process 800 for estimating a size of a biological anomaly. At block 805, image-processing system 125 accesses a medical image. The medical image depicts at least part of a biological anomaly (e.g., a tumor or lesion). The medical image may be a two-dimensional image or three-dimensional image. The medical image may be a CT image, MRI image, x-ray image, etc. The medical image may have been collected by and/or accessed by image-generation system 105.

At block 810, generator network controller 140 generates a modified image of the medical image using an anomaly-removal Generator network. The modified image may be generated or predicted (by the anomaly-removal Generator network) to lack the depiction of the at least part of the biological anomaly. The anomaly-removal Generator network may have been trained by GAN training controller 135 training a GAN. The modified image may be generated based on processing (by generator network controller 140) of the pre-processed image. The GAN may have included at least the anomaly-removal Generator network and one or more Discriminator networks. The GAN may have also included an anomaly-addition Generator network and/or one or more Prediction networks.

At block 815, a size of the biological anomaly is estimated (e.g., by size detector 145) based on the medical image and the modified image. For example, the original image (or a pre-processed version thereof) is subtracted from the modified image to generate a remaining image. The remaining image may then be processed by (for example) summing or averaging voxels or pixels in the remaining image (e.g., potentially after applying a filtering and/or thresholding).

At block 820, the estimated size of the biological anomaly is output (e.g., by image-processing system 125 and/or to user device 150). The outputting can include transmitting the estimated size and/or presenting the estimated size. In some instances, the outputting includes transmitting and/or presenting a result based on the estimated size (e.g., treatment recommendation).

V. EXAMPLES

V.A. Example 1

Figure 9:
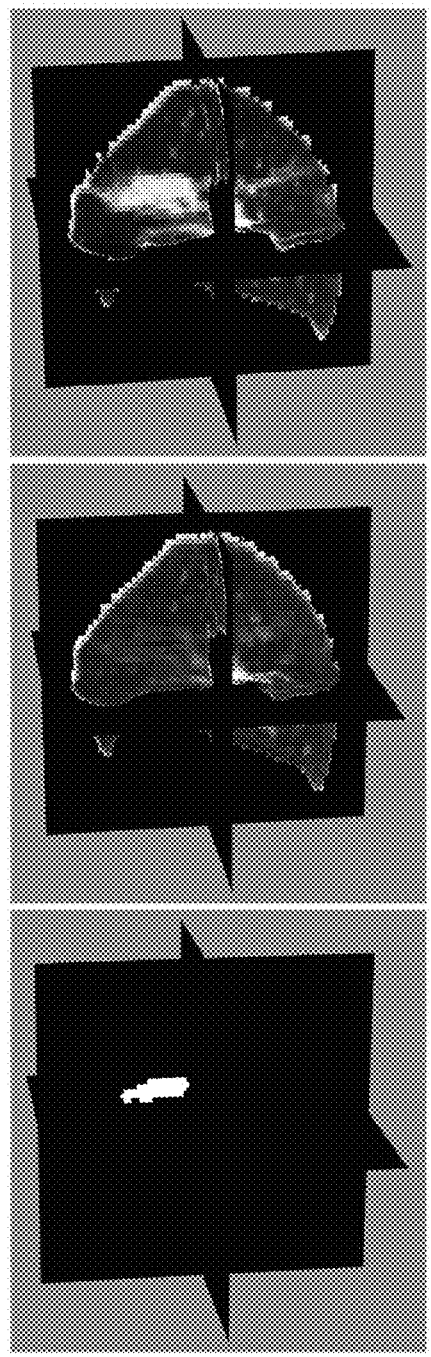
FIG. 9 illustrates an example of images used and generated using a Cycle-GAN to detect a lesion.

FIG. 9 illustrates an example of images used and generated using a Cycle-GAN to detect a lesion. The top image in FIG. 9 shows three real orthogonal CT slices of a subject's right lung. The visualization of the slices shows the slices intersecting in a three-dimensional space, so as to represent the spatial relationship between the slices. Each of the real orthogonal CT slices included a depiction of a lesion.

A Cycle-GAN model having an architecture as represented in FIG. 2 was trained using training data. The trained anomaly-removal Generator network $G_X$ then processed each of the three real CT slices to generate a corresponding fake CT image that is predicted to lack a depiction of the lesion. These fake tumor-absent images are shown interesting in the three-dimensional space in the middle image of FIG. 9.

For each of the real images, the corresponding fake image was subtracted from the real image to generate a predicted two-dimensional depiction of the tumor. The bottom image of FIG. 9 shows the tumor-prediction images intersecting in the three-dimensional space. Predicting a size of the tumor in each of three dimensions may facilitate estimating a longest diameter of the tumor. For example, a longest diameter of the tumor depiction may be estimated for each of the three tumor-prediction images, and a longest diameter can be defined to be a maximum of the three longest diameters.

V.B. Example 2

Figure 10:
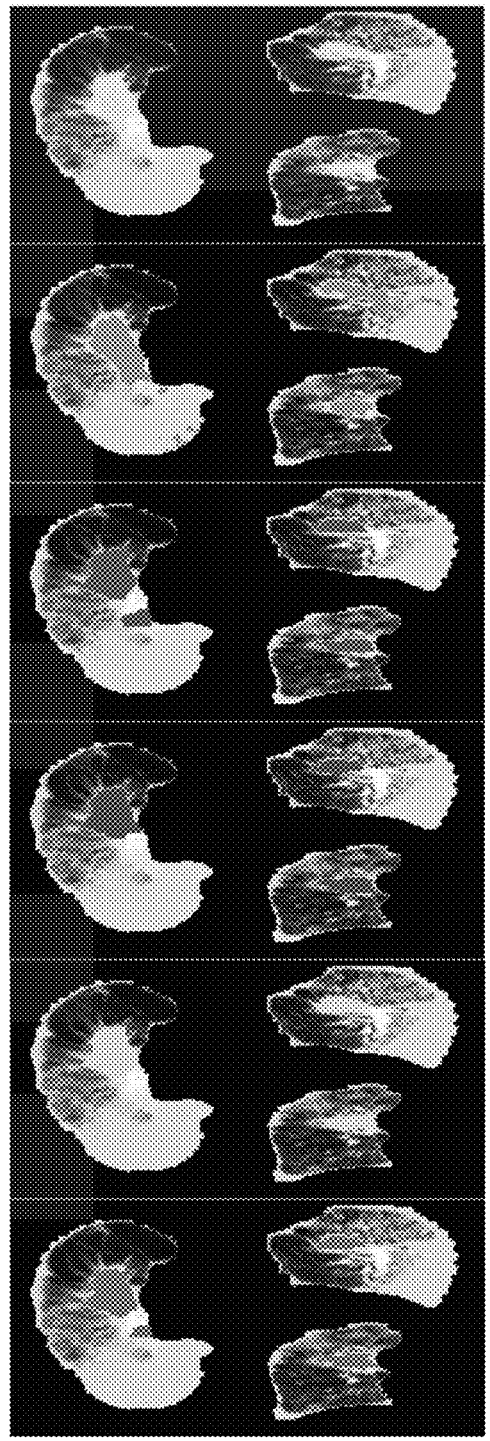
FIG. 10 illustrates exemplary lesion detections as performed by using a Cycle-GAN algorithm or by four human readers.

FIG. 10 illustrates exemplary lesion detections as performed by using a Cycle-GAN algorithm or by four human readers. The No Mask images shown in FIG. 10 are the same images as shown in the top image of FIG. 9. However, here, the images are arranged to be side-by-side instead of intersecting. The remaining images show the same No Mask images, but a predicted lesion depiction is overlaid. The predicted lesion depictions shown in the Algorithm images are the same as those shown in the bottom image of FIG. 9 and were calculated by comparing the No-Mask images to fake anomaly-absent images (generated by an anomaly-removal Generator network trained using a Cycle-GAN).

The remaining images show annotations of the lesion as made by each of four human readers. Notably, the predicted lesion areas identified by using the anomaly-removal Generator network was similar to the lesions areas identified by the human readers.

V.C. Example 3

A training data set was defined to include 1,300 full-body CT images of chest volumes with cancer lesions and 300 full-body CT images of chest volumes free of cancer. Each image was labeled so as to indicate whether the image corresponded to a chest volume with cancer (having one or more lesions) or not. The data was split 80:20 for training and testing. A model having an architecture as depicted in FIG. 4 was trained using the training data.

Figure 11:
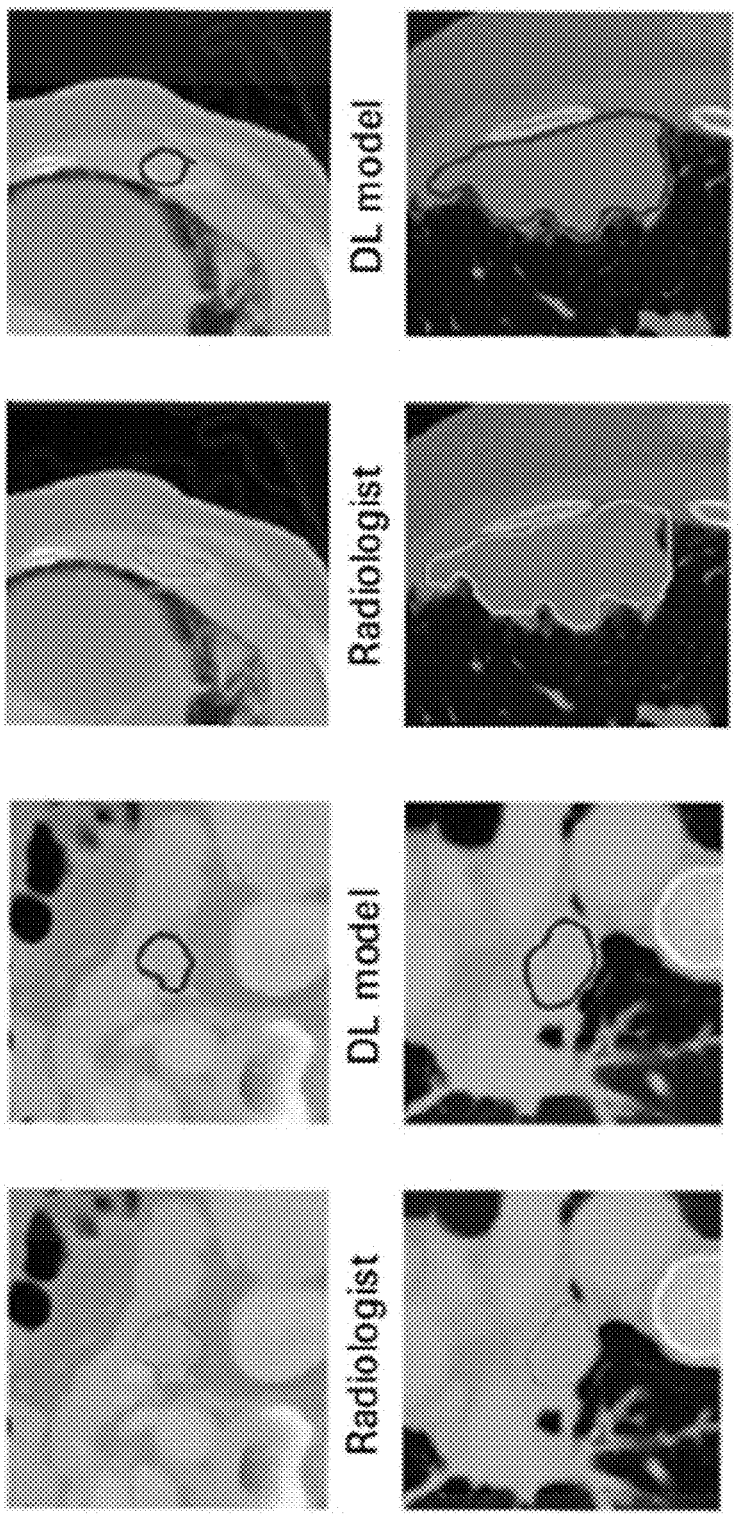
FIG. 11 illustrates exemplary results of a trained Recycle GAN detecting lesions as compared to a radiologist's lesion detections.

FIG. 11 shows results from processing of the testing data, by comparing the lesion detection output by the trained model as compared to lesion detection from an experienced radiologist. Notably, the depicted results are quite consistent. The model had an ROI-level sensitivity or 0.94 and a lesion-level sensitivity of 0.89. The segmentation achieved a 0.2 Dice Similarity Coefficient.

VI. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The invention claimed is:

1. A computer-implemented method comprising:
accessing a medical image corresponding to a subject and depicting at least part of a biological anomaly, the biological anomaly being of a particular type of biological anomaly;
generating a modified image based on the medical image and using an anomaly-removal Generator network, wherein a set of parameters of the anomaly-removal Generator network was defined by training a Generative Adversarial Network that included:
the anomaly-removal Generator network;
an anomaly-addition Generator network;
a first Discriminator network configured to discriminate between (i) real images that were labeled as depicting at least part of the biological anomaly of the particular type of biological anomaly and (ii) fake images generated at least in by the anomaly-addition Generator network, wherein the anomaly-addition Generator network received feedback based on first discrimination results generated by the first Discriminator network; and
a second Discriminator network configured to discriminate between (i) real images that that were labeled as not depicting any biological anomaly of the particular type of biological anomaly and (ii) fake images generated by the anomaly-removal Generator network, wherein the anomaly-removal Generator network received feedback based on second discrimination results generated by the second Discriminator network;
estimating a size of the biological anomaly based on the medical image and the modified image; and
outputting the estimated size of the biological anomaly.

2. The computer-implemented method of claim 1, further comprising:
training the anomaly-addition Generator network by training the Generative Adversarial Network.

3. The computer-implemented method of claim 2, wherein the training the anomaly-addition Generator network comprises:
inputting, to the anomaly-removal Generator network, a real anomaly-present image that depicts at least part of the biological anomaly of the particular type of biological anomaly;
generating, using at least the anomaly-removal Generator network and the real anomaly-present image, a fake anomaly-absent image;
inputting, to the anomaly-addition Generator network, the fake anomaly-absent image;
generating, using the anomaly-addition Generator network and the fake anomaly-absent image, a cycled fake anomaly-present image;
comparing the cycled fake anomaly-present image to the real anomaly-present image;
determining a first cyclic loss based on the comparison of the cycled fake anomaly-present image to the real anomaly-present image;
performing, using the first Discriminator network, a first discrimination to predict whether the cycled fake anomaly-present image corresponds to a true image of an actual sample or a fake image; and
adjusting one or more weights of the anomaly-addition Generator network based on the first cyclic loss and the first discrimination performed by the first Discriminator network.

4. The computer-implemented method of claim 1, further comprising training the anomaly-removal Generator network by training the Generative Adversarial Network.

5. The computer-implemented method of claim 1, further comprising:
pre-processing the medical image to adjust a distribution of each of one or more color channels, wherein the modified image is generated based on the pre-processed medical image.

6. The computer-implemented method of claim 1, further comprising:
pre-processing the medical image to perform a segmentation of a particular organ, wherein the modified image is generated based on the pre-processed medical image.

7. The computer-implemented method of claim 1, wherein estimating the size of the biological anomaly includes:
subtracting the modified image from the medical image.

8. The computer-implemented method of claim 1, wherein the particular type of biological anomaly is a lesion or tumor.

9. The computer-implemented method of claim 1, wherein the medical image includes a CT image, x-ray image or MRI image.

10. The computer-implemented method of claim 1, wherein the medical image includes a three-dimensional image.

11. The computer-implemented method of claim 1, wherein the anomaly-removal Generator network includes a convolutional neural network.

12. The computer-implemented method of claim 1, wherein a training data set used to train the Generative Adversarial Network lacked any identification of a boundary, area, or volume of any depicted anomaly of the particular type of biological anomaly.

13. A method comprising:
availing, by a user device and to a computing system, a medical image corresponding to a subject and depicting a part of a biological anomaly, the biological anomaly being of a particular type of biological anomaly; and
receiving, at the user device and from the computing system, an estimated size of the biological anomaly, wherein the computing system determined the estimated size by:
generating a modified image based on the medical image and using an anomaly-removal Generator network wherein a set of parameters of the anomaly-removal Generator network was defined by training a Generative Adversarial Network that included:
the anomaly-removal Generator network;
an anomaly-addition Generator network;
a first Discriminator network configured to discriminate between (i) real images that were labeled as depicting at least part of the biological anomaly of the particular type of biological anomaly and (ii) fake images generated at least in by the anomaly-addition Generator network, wherein the anomaly-addition Generator network received feedback based on first discrimination results generated by the first Discriminator network; and
a second Discriminator network configured to discriminate between (i) real images that that were labeled as not depicting any biological anomaly of the particular type of biological anomaly and (ii) fake images generated by the anomaly-removal Generator network, wherein the anomaly-removal Generator network received feedback based on second discrimination results generated by the second Discriminator network; and
determining the estimated size of the biological anomaly based on the medical image and the modified image.

14. The method of claim 13, further comprising:
selecting a diagnosis or treatment recommendation for the subject based on the estimated size.

15. The method of claim 14, further comprising:
conveying the selected diagnosis or treatment recommendation to the subject.

16. The method of claim 13, further comprising:
collecting the medical image using a medical imaging system.

17. A system comprising:
one or more data processors; and
a non-transitory computer readable storage medium containing instructions which, when executed on the one or more data processors, cause the one or more data processors to perform operations comprising:
accessing a medical image corresponding to a subject and depicting at least part of a biological anomaly, the biological anomaly being of a particular type of biological anomaly;
generating a modified image based on the medical image and using an anomaly-removal Generator network, wherein a set of parameters of the anomaly-removal Generator network was defined by training a Generative Adversarial Network that included:
the anomaly-removal Generator network;
an anomaly-addition Generator network;
a first Discriminator network configured to discriminate between (i) real images that were labeled as depicting at least part of the biological anomaly of the particular type of biological anomaly and (ii) fake images generated at least in by the anomaly-addition Generator network, wherein the anomaly-addition Generator network received feedback based on first discrimination results generated by the first Discriminator network; and
a second Discriminator network configured to discriminate between (i) real images that that were labeled as not depicting any biological anomaly of the particular type of biological anomaly and (ii) fake images generated by the anomaly-removal Generator network, wherein the anomaly-removal Generator network received feedback based on first discrimination results generated by the first Discriminator network;
estimating a size of the biological anomaly based on the medical image and the modified image; and
outputting the estimated size of the biological anomaly.

18. A computer-program product tangibly embodied in a non-transitory machine-readable storage medium, including instructions configured to cause one or more data processors to perform operations comprising:
accessing a medical image corresponding to a subject and depicting at least part of a biological anomaly, the biological anomaly being of a particular type of biological anomaly;
generating a modified image based on the medical image and using an anomaly-removal Generator network, wherein a set of parameters of the anomaly-removal Generator network was defined by training a Generative Adversarial Network that included:
the anomaly-removal Generator network;
an anomaly-addition Generator network;
a first Discriminator network configured to discriminate between (i) real images that were labeled as depicting at least part of the biological anomaly of the particular type of biological anomaly and (ii) fake images generated at least in by the anomaly-addition Generator network, wherein the anomaly-addition Generator network received feedback based on first discrimination results generated by the first Discriminator network; and
a second Discriminator network configured to discriminate between (i) real images that that were labeled as not depicting any biological anomaly of the particular type of biological anomaly and (ii) fake images generated by the anomaly-removal Generator network, wherein the anomaly-removal Generator network received feedback based on first discrimination results generated by the first Discriminator network;
estimating a size of the biological anomaly based on the medical image and the modified image; and
outputting the estimated size of the biological anomaly.

19. The method of claim 4, wherein the training the anomaly-removal Generator network comprises:
inputting, to the anomaly-addition Generator network, a real anomaly-absent image that does not depict any biological anomaly of the particular type of biological anomaly;
generating, using at least the anomaly-addition Generator network and the real anomaly-absent image, a fake anomaly-presence image;
inputting, to the anomaly-removal Generator network, the fake anomaly-presence image;
generating, using the anomaly-removal Generator network and the fake anomaly-presence image, a cycled fake anomaly-absent image;
comparing the cycled fake anomaly-absent image to the real anomaly-absent image;
determining a second cyclic loss based on the comparison of the cycled fake anomaly-absent image to the real anomaly-absent image;
performing, using the second Discriminator network, a second discrimination to predict whether the cycled fake anomaly-absent image corresponds to a true image of an actual sample or a fake image; and
adjusting one or more weights of the anomaly-removal Generator network based on the second cyclic loss and the second discrimination performed by the second Discriminator network.

20. The system of claim 17, wherein the operations further comprise:
training the anomaly-addition Generator network by training the Generative Adversarial Network, comprising:
inputting, to the anomaly-removal Generator network, a real anomaly-present image that depicts at least part of the biological anomaly of the particular type of biological anomaly;
generating, using at least the anomaly-removal Generator network and the real anomaly-present image, a fake anomaly-absent image;
inputting, to the anomaly-addition Generator network, the fake anomaly-absent image;
generating, using the anomaly-addition Generator network and the fake anomaly-absent image, a cycled fake anomaly-present image;
comparing the cycled fake anomaly-present image to the real anomaly-present image;
determining a first cyclic loss based on the comparison of the cycled fake anomaly-present image to the real anomaly-present image;
performing, using the first Discriminator network, a first discrimination to predict whether the cycled fake anomaly-present image corresponds to a true image of an actual sample or a fake image; and
adjusting one or more weights of the anomaly-addition Generator network based on the first cyclic loss and the first discrimination performed by the first Discriminator network; and/or
training the anomaly-removal Generator network by training the Generative Adversarial Network, comprising:
inputting, to the anomaly-addition Generator network, a real anomaly-absent image that does not depict any biological anomaly of the particular type of biological anomaly;
generating, using at least the anomaly-addition Generator network and the real anomaly-absent image, a fake anomaly-presence image;
inputting, to the anomaly-removal Generator network, the fake anomaly-presence image;
generating, using the anomaly-removal Generator network and the fake anomaly-presence image, a cycled fake anomaly-absent image;

comparing the cycled fake anomaly-absent image to the real anomaly-absent image;
determining a second cyclic loss based on the comparison of the cycled fake anomaly-absent image to the real anomaly-absent image;
performing, using the second Discriminator network, a second discrimination to predict whether the cycled fake anomaly-absent image corresponds to a true image of an actual sample or a fake image; and
adjusting one or more weights of the anomaly-removal Generator network based on the second cyclic loss and the second discrimination performed by the second Discriminator network.

21. The computer-program product of claim 18, wherein the operations further comprise:
training the anomaly-addition Generator network by training the Generative Adversarial Network, comprising:
inputting, to the anomaly-removal Generator network, a real anomaly-present image that depicts at least part of the biological anomaly of the particular type of biological anomaly;
generating, using at least the anomaly-removal Generator network and the real anomaly-present image, a fake anomaly-absent image;
inputting, to the anomaly-addition Generator network, the fake anomaly-absent image;
generating, using the anomaly-addition Generator network and the fake anomaly-absent image, a cycled fake anomaly-present image;
comparing the cycled fake anomaly-present image to the real anomaly-present image;
determining a first cyclic loss based on the comparison of the cycled fake anomaly-present image to the real anomaly-present image;
performing, using the first Discriminator network, a first discrimination to predict whether the cycled fake anomaly-present image corresponds to a true image of an actual sample or a fake image; and
adjusting one or more weights of the anomaly-addition Generator network based on the first cyclic loss and the first discrimination performed by the first Discriminator network; and/or
training the anomaly-removal Generator network by training the Generative Adversarial Network, comprising:
inputting, to the anomaly-addition Generator network, a real anomaly-absent image that does not depict any biological anomaly of the particular type of biological anomaly;
generating, using at least the anomaly-addition Generator network and the real anomaly-absent image, a fake anomaly-presence image;
inputting, to the anomaly-removal Generator network, the fake anomaly-presence image;
generating, using the anomaly-removal Generator network and the fake anomaly-presence image, a cycled fake anomaly-absent image;
comparing the cycled fake anomaly-absent image to the real anomaly-absent image;
determining a second cyclic loss based on the comparison of the cycled fake anomaly-absent image to the real anomaly-absent image;
performing, using the second Discriminator network, a second discrimination to predict whether the cycled fake anomaly-absent image corresponds to a true image of an actual sample or a fake image; and
adjusting one or more weights of the anomaly-removal Generator network based on the second cyclic loss and the second discrimination performed by the second Discriminator network.

* * * * *